(12) United States Patent
Thakkar

(10) Patent No.: US 12,541,189 B2
(45) Date of Patent: Feb. 3, 2026

(54) SYSTEM AND METHOD FOR FACTORY AUTOMATION AND ENHANCING MACHINE CAPABILITIES

(71) Applicant: EINNOSYS TECHNOLOGIES LLP, Gujarat (IN)

(72) Inventor: Niravkumar Champaklal Thakkar, Gujarat (IN)

(73) Assignee: Einnosys Technologies LLP, Ahmedabad (IN)

( * ) Notice: Subject to any disclaimer, the term of this patent is extended or adjusted under 35 U.S.C. 154(b) by 354 days.

(21) Appl. No.: 17/911,307

(22) PCT Filed: Mar. 11, 2021

(86) PCT No.: PCT/IN2021/050239
§ 371 (c)(1),
(2) Date: Sep. 13, 2022

(87) PCT Pub. No.: WO2021/186462
PCT Pub. Date: Sep. 23, 2021

(65) Prior Publication Data
US 2023/0110483 A1   Apr. 13, 2023

(30) Foreign Application Priority Data

Mar. 14, 2020   (IN) .............................. 202021011064
Nov. 30, 2020   (IN) .............................. 202021052055

(51) Int. Cl.
*G05B 19/41*   (2006.01)
*G05B 19/4155*   (2006.01)

(52) U.S. Cl.
CPC ................. *G05B 19/4155* (2013.01); *G05B 2219/31368* (2013.01)

(58) Field of Classification Search
CPC ...... G05B 19/4155; G05B 2219/31368; G05B 2219/24097; G05B 2219/31457;
(Continued)

(56) References Cited

U.S. PATENT DOCUMENTS 9,928,450 B2   3/2018 Geva et al.
2017/0084273 A1*   3/2017 Zohar ..................... G10L 15/22
(Continued)

FOREIGN PATENT DOCUMENTS

CN   106444648 A   2/2017

OTHER PUBLICATIONS

English abstract of CN106444648A.
International Search Report for related PCT Application No. PCT/IN2021/050239 dated Jul. 26, 2021.

*Primary Examiner* — Christopher W Carter
(74) *Attorney, Agent, or Firm* — Boyle Fredrickson, S.C.

(57) ABSTRACT

System and Method for Factory Automation and Enhancing Machine Capabilities The present invention relates to system and method for factory automation and for enhancing machine capabilities. The system is configured to extract data from machine through data capturing module, data extraction module and data conversion module and jointly analyze them with data from other equipment and sensors through data analysis engine and transmitting to factory systems in user configured protocol through protocol conversion module. It also accepts machine control commands from the factory systems and executes them through command processor and mouse & keyboard simulator modules. It involves combining GUI from multiple equipments/sensors and sending to single display device through GUI manager and video output modules and mapping required actions of mouse clicks and keyboard entries from new to old user interfaces. GUI manager module detects GUI elements from captured images and applies user configura-
(Continued)

tion to automatically design new GUI that includes data from other external sensors and devices.

7 Claims, 3 Drawing Sheets

(58) Field of Classification Search
CPC .......... G05B 2219/32128; G05B 2219/35444; G05B 19/4184; G05B 19/4183
See application file for complete search history.

(56) References Cited

U.S. PATENT DOCUMENTS

| | | |
|---|---|---|
| 2017/0249731 A1 | 8/2017 | Van Gorp et al. |
| 2018/0017959 A1* | 1/2018 | Pandian ................. G06Q 10/06 |
| 2019/0391568 A1 | 12/2019 | Rashidi et al. |

* cited by examiner

SYSTEM AND METHOD FOR FACTORY AUTOMATION AND ENHANCING MACHINE CAPABILITIES

The Complete Specification is a combination of Provisional Patent Application No. 202021011064 Filed on Mar. 14, 2020 and Provisional Patent Application No. 202021052055 Filed on Nov. 30, 2020.

FIELD OF THE INVENTION

The present invention relates to factory automation and more particularly it relates to a system and method for automation of factory equipment/machine, and enhancing equipment capabilities without installing or modifying any internal hardware or software.

BACKGROUND OF THE INVENTION

Generally, Factories use automation to prevent misprocessing of their product, troubleshoot quality failures, equipment performance issues, improve equipment uptime and other means of improving manufacturing efficiencies and reduce cost. In order to achieve these, factory systems need to collect and correlate data from various equipment, devices and sensors, which include real-time process parameters such as temperature, pressure, gas flows, power, current, etc., alarms or errors and critical events such as start of process or start of a process step, etc. It also requires the capability to send commands from factory software systems to the equipment to automate manual tasks. In Semiconductor, PV, Flat Panel Display and other electronics manufacturing, automation systems communicate with factory equipment using SECS/GEM protocols. In other industries they communicate through other protocols such as Modbus, OPC, JSON, MQTT, etc. To take full advantage of Industrial Internet of Things (IIoT) and Industry 4.0, automation needs to be extended to collecting data not only from an equipment but also collecting and correlating data from other sensors and equipment and analyzing them and take necessary actions automatically to improve quality, throughput and equipment uptime and reduce cost. This requires enhancing equipment capabilities by modifying equipment hardware or software.

One such automation system has been disclosed in patent document US2019/0391568 that discloses an apparatus, method, and non-transitory machine-readable medium provide for improved feature extraction and fault detection in a non-stationary process through unsupervised machine learning. The apparatus includes a memory and a processor operably connected to the memory. The processor receives training data regarding a field device in an industrial process control and automation system; extracts a meaningful feature from the training data; performs an unsupervised classification to determine a health index for the meaningful feature; identifies a faulty condition of real-time data using the health index of the meaningful feature; and performs a rectifying operation in the industrial process control and automation system for correcting the faulty condition of the field device.

However, lots of factories have some old factory equipment that were designed before the evolution of automation technology. Hence, such machines are not automation capable. Hence, the problem of data collection of the process parameters from and the control of such automation incapable equipment still prevail in the industries, some of which costs factories a lot in terms of scrapped product, quality of the product, increased maintenance and engineering costs and lost productivity. Solutions have been developed and adopted in order to obviate this long standing problem. For example, many factories-semiconductor and others that have equipment that are not automation capable have to upgrade the equipment to a newer generation or replace with some other equipment with automation capability which can be very expensive and causes disruption in the factory during the upgrade. It also requires requalifying the upgraded equipment for quality and performance. Occasionally, some third party software or hardware company may provide software or hardware that has to be installed on the factory equipment to add automation capability, but this can be very risky and could put the reliability and/or performance of the equipment at risk. Further, one more solution to provide automation to such old machine is to hack the equipment by finding out how that equipment and PLC is working and intervene whatever software running on the PC is sending to PLC and come in between to trap that signal and decode that signal to give automation capability. However, such solution can be very risky, clumsy, cumbersome and expensive and require lots of skill because the third party has no knowledge about equipment.

In order to obviate this long standing problem, various devices have been developed that help factories to collect data from factory equipment that doesn't have automation capability and allows sending commands to the factory equipment. However, there are its limitations or disadvantages of such conventional state of art.

First, such conventional system cannot send data or accept command in SECS (Semiconductor Equipment Communication Standard)/GEM (Generic Electronic Module) format, which makes this solution useless in semiconductor, PV, flat panel display and other electronics manufacturing as the de facto communication protocol in those industries are SECS/GEM. Secondly, they are very slow—They cannot handle extracting data at a frequency of 1 second or less which limits the benefit of extracting data and analyzing them. Further, they are very difficult to configure—It uses scripting and is quite complex even for a software engineer to configure without extensive training and skill.

Industry 4.0, Industrial Internet of Things (IIoT), Artificial Intelligence and Machine Learning have opened doors to newer and faster ways of analyzing equipment data and correlating them to other machine or device's data to predict and improve RUL (remaining useful life) of the equipment thereby preventing unexpected breaking of equipment and saving maintenance cost by not performing unnecessary maintenance and replacing spare parts that still have life. It has also prevented damaging expensive equipment components and quality problems with manufactured goods. However, these techniques require additional equipment data such as vibration, acoustic emission, temperature, humidity, etc., which most equipment don't measure and hence additional sensors have to be added to the equipment. Correlating data coming from these sensors with the equipment data such as alarms or errors, events, process parameters such as pressure, gas flow, current, etc., is critical aspect of machine learning, predictive maintenance and determining RUL (remaining useful life). However, since factories don't have the access to the source code of the equipment software, it is difficult to accurately and timely correlate equipment data with external sensor data and take prompt equipment control actions to prevent damage.

In light of the above drawbacks with conventional systems, it is apparent that there is a need to develop a system and method to solve afore-mentioned problem.

OBJECT OF THE INVENTION

The main object of the present invention is to provide a system and method for extracting data-such as process parameters like temperature, pressure, etc., alarms/errors and events such as process started, door close, etc. from the machine including those that are not automation capable and transmitting them in real-time to a factory software system such as a factory host, MES, ERP, FDC (Fault Detection & Classification) or other cloud based systems and allows those systems to control the equipment through commands.

Another object of the present invention is to provide a system and method for factory automation and enhancing machine capabilities without requiring any software or hardware to be installed, as it is a plug-n-play solution.

One more object of the present invention is to provide a system and method for factory automation and enhancing machine capabilities that allows factory users to monitor the performance and quality of material processing on equipment including old, legacy ones that are not automation capable to prevent mis-processing of expensive products, extend life of spare parts, reduce maintenance cycles and save cost of purchasing new equipment and hiring more manpower by increasing throughput.

One more object of the present invention is to provide a system and method of extracting data from an equipment and combining it with data from other equipment or devices, analyze them in real-time and then control the equipment in such a way as to prevent damage to the equipment or material being processed by issuing stop or abort commands and notifying factory software system or personnel to take timely action.

One more object of the present invention is to make an old and legacy equipment "Smart" by adding automation capability so that it can become industry 4.0 and Industry internal of Things (IIoT) capable without any internal hardware or software install.

One more object of the present invention is to enhance capabilities of an existing machine by modifying graphical user interface (GUI) of the equipment for local language or other changes to meet the needs of the factory without making any hardware or software changes to the equipment.

One more object of the present invention is to enhance capabilities of the existing equipment software without modifying its source code, which has been the only way to modify equipment software capabilities.

SUMMARY OF THE INVENTION

The present invention relates to a system and method for extracting data of different types-process parameters, recipe or setpoint parameters, equipment configuration, alarms/errors and events from the equipment/machine and sending commands or instructions to the factory equipment/machine. Said system enables to extract data from the factory equipment (including the ones not automation capable), combine and analyze with data coming from other equipment or sensors and send to the factory host, MES or ERP without installing any hardware or software on the factory equipment. Further, the system according to present invention supports SECS/GEM, Modbus, OPC, JSON, MQTT and custom protocols so that the data can be sent to multiple systems in the communication protocol those systems understand. Further, it also enables controlling of factory equipment by factory systems such as host, MES or ERP system that wants to control the equipment to prevent human errors of selecting wrong recipes, when to start and stop processing, pause/resume or abort processing to prevent misprocessing, etc. It also allows performing other custom machine control actions through configuration and customizing application, such as adding or modifying recipes and configuration settings. Present invention also allows extracting data from other devices or sensors and analyzes together will data collected from factory equipment/machine. Based on the analysis, if any action needs to be taken to prevent misprocessing of the material being processed or damage to the equipment or improve safety, the present invention takes those actions on the equipment, even if the machine is otherwise not capable of accepting commands or instructions from external systems. The present invention allows modification of the equipment software graphical user interface (GUI) without modifying the equipment software source code, which is the only way to change the GUI.

BRIEF DESCRIPTION OF THE DRAWING

Objects and advantages of the invention will be apparent from the following detailed description taken in conjunction with the accompanying figures of the drawing wherein.

DETAILED DESCRIPTION OF THE INVENTION

Figure 1:
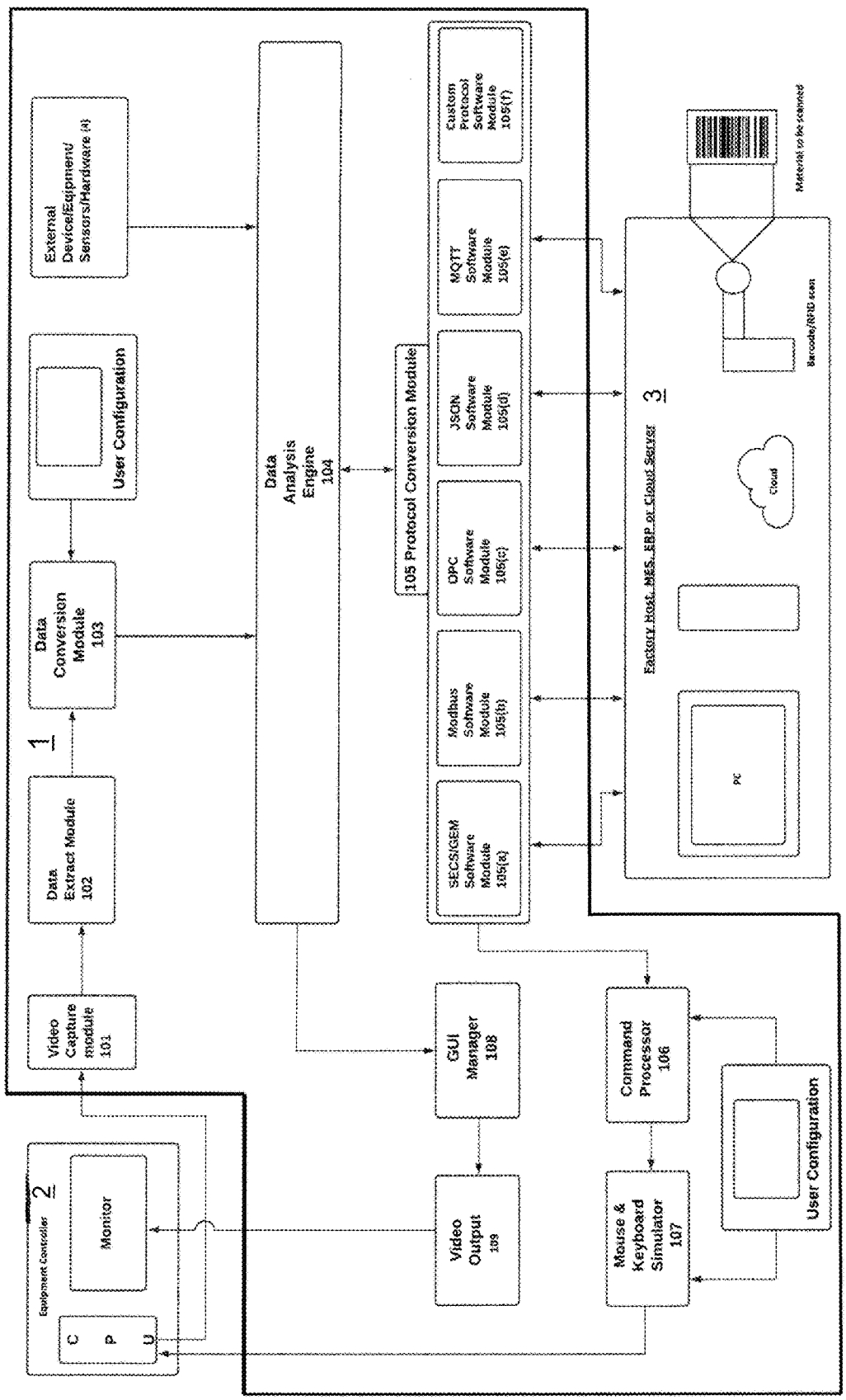
FIG. 1 depicts a block diagram of System and Method for extracting data from a factory equipment/machine and analyzing with external devices and sensors and also controlling machine by factory host MES or ERP systems according to present invention.

For simplicity and clarity of illustration, elements in the figures are not necessarily drawn to scale. Also, descriptions and details of well-known steps and elements may be omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to be limiting of the present disclosure. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

The present invention discloses the system and method for factory automation and enhancing machine capabilities by extracting data from machine and jointly analyzing them with data from other equipment and sensors and transmitting them to factory controlling systems that enable automation capability like extracting data from the equipment, sending commands such as START, ABORT, RECIPE SELECT etc. to the equipment, querying it's processing state, adding or modifying recipe or setpoint values and equipment configuration parameters on a factory equipment that is otherwise not automation capable. It also involves combining user interface from multiple equipments and sensor and sending to a single display device and mapping required actions of mouse clicks and keyboard entries from new to old user interface. It also involves sending equipment data to cloud server for analysis and take action suggested by machine learning engine on the cloud there by converting an old/legacy factory into a smart factory.

It is to be understood that the term "factory equipment/machine" includes any kind of object, machine or equipment wherefrom the data is to be extracted, transmitted and/or controlled by the user through the system according to present invention.

The term "data" includes but is not limited to real-time process parameters, such as temperature, pressure, power, gas flows, etc., machine configuration, such as base pressure, type of hardware, etc., alarms or errors occurring on the equipment and critical events related to the processing of raw material, such as processing started, door opened, etc., or equipment state such as processing, idle, stopped, etc.

Automation here includes but is not limited to extracting data, including but not limited to real-time process parameters, recipe parameters, equipment configuration parameters, alarms and events from factory equipment and transmitting to a factory host, ERP, MES, database or other enterprise system. It includes sending that data to cloud servers for analyzing and correlating with data from other equipment and sensors. It also includes enabling the factory equipment to accept commands from a factory host, ERP, MES or other such systems. It also includes mixing user interfaces of multiple equipment and sensors into a single GUI of all relevant manufacturing information and displaying on a video output device such as a PC monitor.

Figure 3:
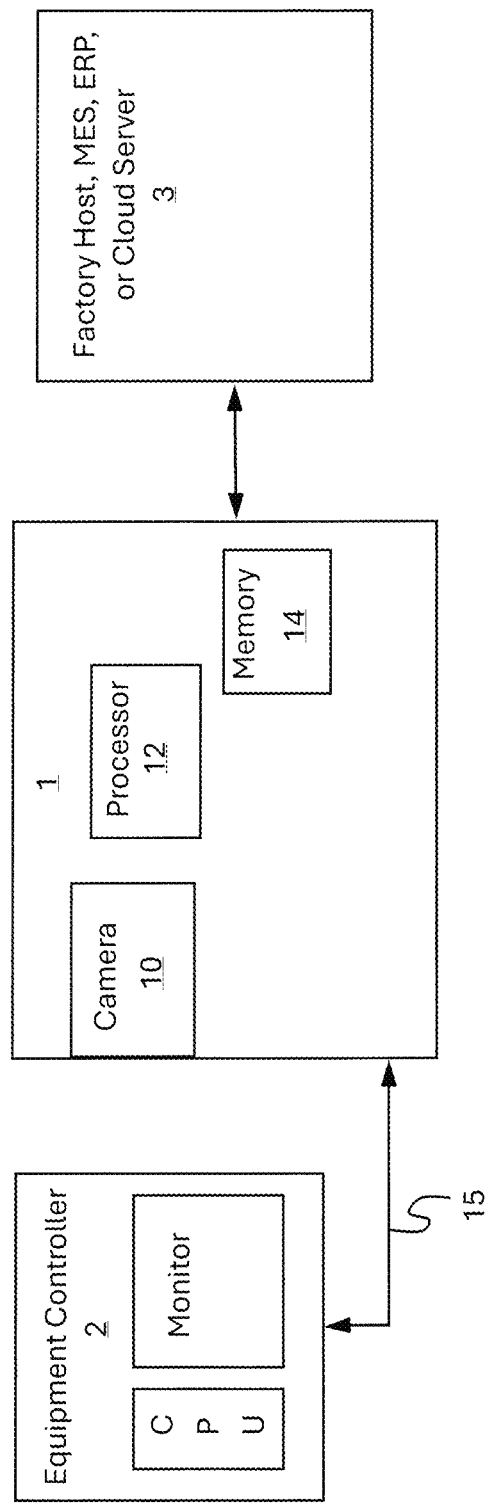
FIG. 3 depicts a block diagram of the system according to one embodiment of the invention connected between a machine controller and a factory host.

FIG. 1 is a block diagram schematically showing a system according to one embodiment of the present disclosure. Now as shown in FIGS. 1 and 3, the system (1) is configured to connect to a machine controller (2) of factory equipment/machine through the cables like VGA/HDMI/DVI and USB, PS/2 or other such ports. Electrical connections between the machine controller (2) and the system (1) are shown in a single line (15) in FIG. 3 for ease of illustration.

The single line (15) represents all electrical connections in either direction between the machine controller (2) and the system (1). In present embodiment, the machine controller (2) includes a computer having a CPU electrically connected to a display device and a keyboard/mouse.

If the factory equipment is not PC based and doesn't have these ports, then the system (1) according to present invention will be connected through an external camera (10) that is overlooking the HMI, PLC or other display of the factory equipment. Through processing images of equipment PC or display and applying OCR technology with the system's algorithm, it processes various information from the screen and categorizes them as image, data, alarm or event. The computer of the factory equipment (2) includes a CPU and a display unit for displaying the data related to process parameters. For connecting the system according to present invention with the computer (machine controller) of the factory equipment, the display unit and the CPU of the computer are connected with the system rather than directly connecting with each other. Hence, the system according to present invention configured to intercept between the CPU and the display device and the CPU and the keyboard and mouse.

The system according to present invention has the capability to collect data from another equipment or sensor through the same way or some other protocol or method. The system (1) includes a CPU (12) and memory (14), where the CPU is in communication with the memory. The memory (14) stores instructions for execution by the CPU (12). The system then could analyze and correlate data from all the sources either locally using modules executing on the CPU, as will be described in more detail below, or can transmit to a cloud based machine learning capable server and send both raw and analyzed data to the factory Host, MES or ERP system. The system according to present invention accepts commands based on analysis from the local or cloud server, factory host, MES or ERP systems and sends to the equipment.

It is to be understood that if the user just wants to collect data and doesn't wants to control the machine (one side communication), user only needs to connect the system with the CPU through the VGA or other such display ports. In such case, no USB or other connection is required.

Further, the system according to present invention is configured with a factory equipment controlling system (3) like a factory host computer, a MES (Manufacturing Execution System), a ERP (Enterprise Resources Planning), local or cloud based machine learning capable data analysis server by defining the data to be captured and its data format. The factory host, MES or ERP systems are designed to understand and interpret data transmitted from the factory equipment/machine (2) and configured to transmit control signal, command, action or instruction to machine (2).

The controlling of factory equipment (2) by the factory equipment controlling system (3) requires user to configure the system as a way to map the name of the command to a series of mouse clicks and keyboard entries on the user interface of the equipment controller software. User configuration is a collection of files and databases stored in memory (14) with information supplied by the user at the time of one-time setup of the system. The information that the user needs to supply to configure the system include, but not limited to—where on the controller software's GUI to collect which information and what does the user want to call it, what is its data type, etc. and which button or set of buttons to click in response to which command received from the factory host (3).

Referring again to FIG. 1, the system (1) according to present invention comprises a video capturing module (101) that is electrically connected with the display unit and the CPU of the machine controller (2), a data extraction module (102) communicating with the video capturing module (101), a data conversion software module (103) communicating with the data extraction module (102), a data analysis engine (104) that is communicating with the data conversion software module (103) and electrically connected to external devices, sensors or equipment (4), a protocol conversion module (105) configured to convert raw or analyzed data into user configured protocol connected electrically to Factory Host, MES, ERP system either locally or on cloud (3), a command processor module (106) that is communicating with the protocol conversion module (105), a keyboard and mouse simulator hardware module (107) that is communicating with the command processor module (106) and also electrically connected to the CPU of the machine controller (2) and also, a GUI manager module (108) which is communicating to the data analysis engine (104) also and is communicating to the video output module (109) and video output module (109) is electrically connected to the display of the machine controller (2) such as a PC monitor, TV or other video output device.

The video capturing module (101) is configured to capture screenshots or pictures as fast as a few milliseconds based on user configuration of what is displaying on the display of the machine controller (2) periodically. Said data extraction module (102) breaks the images captured from the video capturing module (101) into many pieces and applies user configuration to extract data from the screenshot or pictures through OCR (Optical Character Recognition) technology. The data conversion software module (103) is configured to convert the extracted data from the images into user configured format and also categorizes the data into Alarm, Event, Image or Data "tags" and sends them to the data analysis engine (104) which is configured to combine, correlate and analyze data from external sensors devices or equipment (4) using various machine learning (ML) or deep learning (DL) techniques and then send both analyzed and raw data to factory equipment controlling system (3). The GUI Manager (108) is configured to combine user interface of the machine controller (2) and other devices (4) and send to the display of the machine controller (2) through Video Output (109). Said data analysis engine (104) also sends raw and analyzed data to a protocol conversion module (105), which formats data into user configured protocol before sending to factory equipment controlling system (3).

For machine control, the system further comprises a command processor module (106) that uses the user configuration to identify a series of mouse clicks and keyboard entries required to be performed to execute the command sent by the factory host, MES or ERP system (3) and a keyboard and mouse simulator hardware module (107) that is connected to the CPU of the machine controller (2) through USB, PS/2, RS232 or other cables performs the required mouse clicks and/or keyboard entries to execute the command. Said Keyboard and mouse simulator hardware module (107) is connected to the CPU of the machine controller (2) via USB, PS/2, RS232 or other cables and it's a combination of hardware and software that simulates the mouse and keyboard for the factory equipment PC. The GUI manager module (108) combines GUI of the equipment controller (2) and those of other devices, equipment or sensors (4) and displays on the monitor through VGA/DVI/HDMI or other video output cable.

Said protocol conversion module (105) includes a SECS/GEM software module (105*a*), a Modbus software module (105*b*), an OPC software module (105*c*), a JSON software module (105*d*) and a MQTT software module (105*e*) or a custom software module (105*f*). It is to be understood that other protocols may also be added as per requirements through custom software module (105*f*).

Now, depending on which of the industrial data transmission protocol such as SECS/GEM, Modbus, OPC, JSON or MQTT or custom, the user has configured the system for, the SECS/GEM, OPC, Modbus, JSON, MQTT or custom software module (105*a*, 105*b*, 105*c*, 105*d*, 105*e*, 105*f*) prepares the message to transmit the data to the factory host, MES or ERP server locally or on cloud (3). The Factory host, MES, cloud server or ERP systems (3) are designed to understand and interpret data transmitted by the equipment using the SECS/GEM, Modbus, OPC, JSON, MQTT or custom protocols (105*a*, 105*b*, 105*c*, 105*d*, 105*e*, 105*f*).

Now, in the process of extracting and transmitting data and control of factory equipment using the system according to present embodiment, the process includes following steps:

In first step, user is required to configure the system according to present invention to define the data to be received from the machine controller (2) of the factory equipment and the commands to be sent from the factory equipment controlling system (3) to the machine controller of the factory equipment (2). This application is used for configuration of system only and hence it will be used initially to setup the system and then whenever configuration needs to be changed. This software shows the user the screen of the equipment PC and allows user to define which data to capture and what to call it. This software also allows the user to define mouse clicks and keyboard entries corresponding to various commands.

Now in second step, the video capturing module (101) captures the screenshots or pictures of the processing image of the equipment's display unit periodically at user defined frequency which can be as fast as a few milliseconds. In third step, the data extraction module (102) breaks the images captured from the video capturing module (101) into many pieces and applies user configuration to extract data from the image through the OCR (Optical Character Recognition) technology and converts the information displayed on the image into digital information.

In forth step, if the system is configured to receive data from external equipment, devices or sensors using either the same method or different protocols, it is done and data from all these sources are combined and analyzed as per user configuration in data analysis engine (104).

In fifth step, depending on which format (SECS/GEM, Modbus, OPC, JSON, MQTT or custom) the system is configured to send the data in, the protocol conversion module (105) formats messages in appropriate protocols through the SECS/GEM software module (105*a*), the Modbus software module (105*b*), the OPC software module (105*c*), the JSON software module (105*d*), the MQTT software module (105*e*) or custom software module (105*f*) and sends them to the factory equipment controlling system (3).

The aforementioned steps are performed for extracting and jointly analyzing the data from the machine controller (2) of the factory equipment and other external devices, equipment and sensors. Now, for controlling of the factory equipment, the command from the factory equipment controlling system (3) is sent to the machine controller (2) of the machine through the system according to present invention, following steps are performed.

In first step, the factory equipment controlling system (3) sends a command in either SECS/GEM, OPC, Modbus, JSON, MQTT or custom format to the protocol conversion module (105), which comprise of SECS/GEM, Modbus, OPC, JSON, MQTT or custom software module (105*a*, 105*b*, 105*c*, 105*d*, 105*e*, 105*f*) to interpret the command and accordingly the command is sent to the command processor software module (106).

In second step, the command processor software module (106) of the system uses user configuration to identify the command and convert the command into a series of mouse clicks and keyboard entries required to be performed to execute the command sent by the factory host, MES or ERP system or cloud server (3).

Then, the mouse and keyboard simulator hardware module (107) that is connected to the CPU of the machine controller (2) of the factory equipment through USB, PS/2, RS232 or other cable performs the required mouse clicks and/or keyboard entries to execute the command.

In this way, the system executes the user configuration defined as "Recipe" and keeps collecting data and sends them to external factory systems through SECS/GEM, Modbus, OPC, JSON, MQTT or custom protocol. The "Recipe" also stores configuration of commands such as start processing, abort, etc. from external factory system and mapping them to a set of mouse clicks and keyboard entries required to execute those commands on the factory equipment's machine controller (2).

In one embodiment, the system and method according to present invention also enhances equipment capabilities without any software modification or other software installation. According to this embodiment, the present invention may enhance the capabilities of equipment by adding external devices, sensors or equipment's data and providing other user defined software GUI modifications such as auto adjustment of certain set points depending on the analysis of data from external devices or sensors without installing any extra software or modifying existing equipment software.

Figure 2:
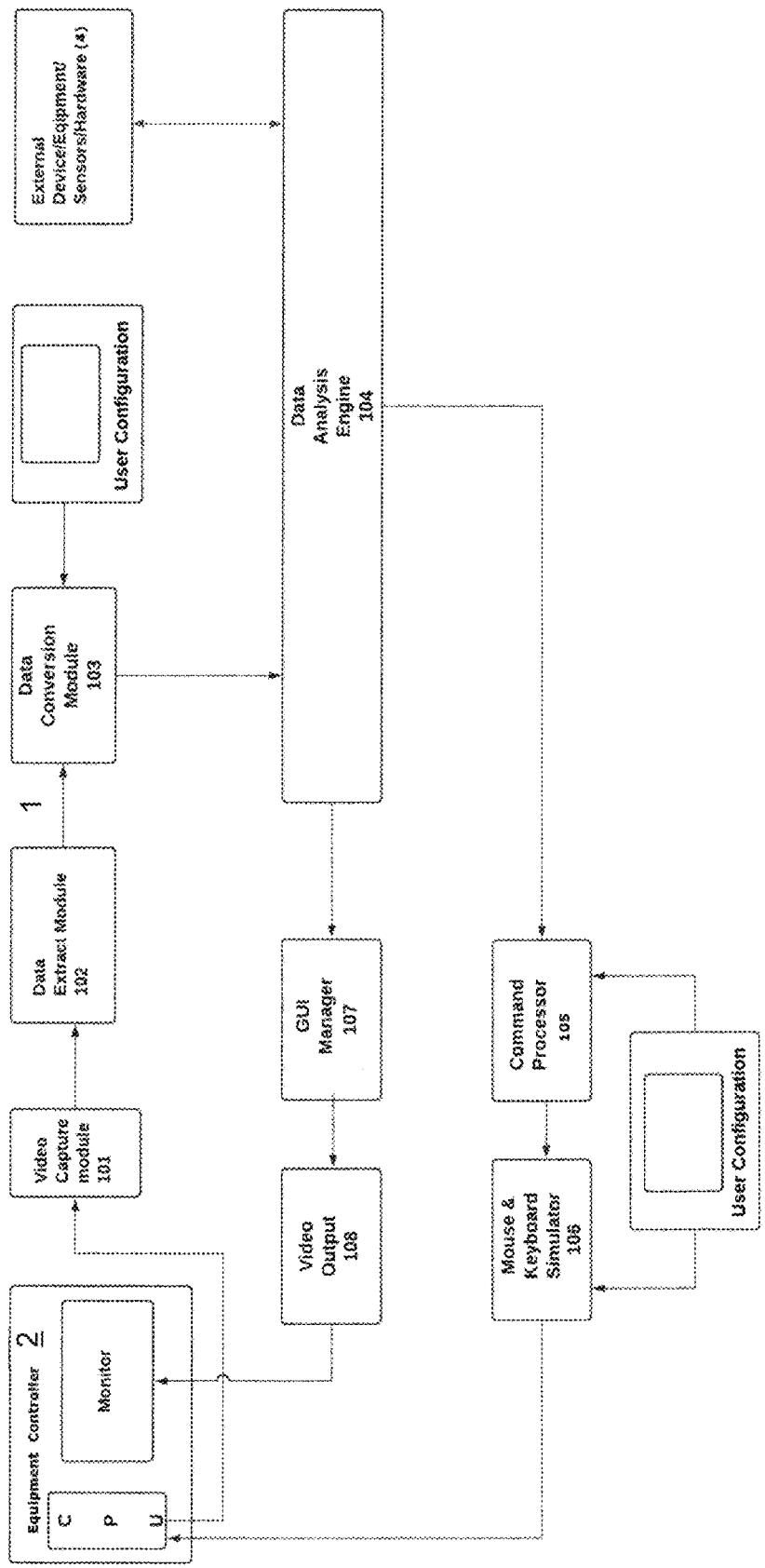
FIG. 2 depicts a block diagram of System and Method for enhancing capabilities of the machine according to present invention.

Now as shown in FIGS. 1 and 2, the system according to present invention takes screenshots of the equipment (machine) controller software through the video capture module (101) and a video cable electrically connected to the CPU of the equipment controller (2). The data extractor module (102) extracts the data from the screenshots. The data conversion software module (103) converts the extracted data from the image into user configured format. The data analysis engine (104) combines and analyzes data from other sensors, devices or equipment (4) using various machine learning (ML) or deep learning (DL) techniques with data extracted from screenshots. The GUI Manager module (108) detects various GUI elements such as push button, drop-down selection, text box, etc. and applies user configuration to design new enhanced GUI that includes data from other external sensors/devices/equipment along with user specified enhancements and sends to a video output module (109), which sends to the display device of the equipment controller (2) such as a monitor. The command processor module (106) detects the keyboard and mouse events on the enhanced GUI and maps or translates them to required keyboard entries and mouse clicks on the original GUI of the equipment controller and sends same activity to mouse and keyboard simulator module (107), which is electrically connected to the CPU of the equipment controller (2). This way, the keyboard and mouse activities performed on the enhanced GUI will be translated into corresponding activities on the equipment controller PC. Thus, graphical user interface (GUI) from the machine controller (2) is combined with other external sensors, devices or equipment to prepare uniform coherent graphical user interface (GUI) and displaying on the display device of the machine controller (2).

Thus, the present invention enables combing, correlating and analyzing data coming from the factory equipment with data coming from other sensors, devices or equipment of the same or different kind and taking necessary action either on its own or by accepting commands from factory systems to prevent misprocessing of production material or failure of the equipment or its part. This way the present invention converts old legacy equipment in to "Smart" Equipment that supports industry 4.0 smart manufacturing, and industrial internal of things (IIoT) initiatives. The present invention does this by not only collecting, correlating and analyzing but also combing the user interface in to a single uniform and coherent graphical user interface (GUI).

Further, the present invention also enables localization or translation of a factory equipment's GUI where GUI Manager (107) extracts GUI elements from the extracted images and redrawing them using user configured language such as Chinese, Japanese or any such language before sending the new translated or localized GUI to the display device through Video Output module (108). Whenever the user clicks mouse or enters localized text in the new localized GUI, the Data Analysis Engine (104) translates them to equivalent mouse clicks and text entries of the original GUI and sends them to the Command Processor module (105) and Mouse and Keyboard Simulator module (106) which executes the mouse clicks and keyboard entries on the original GUI.

The invention has been explained in relation to specific embodiment. It is inferred that the foregoing description is only illustrative of the present invention and it is not intended that the invention be limited or restrictive thereto. Many other specific embodiments of the present invention will be apparent to one skilled in the art from the foregoing disclosure. The scope of the invention should therefore be determined not with reference to the above description but should be determined with reference to claims along with full scope of equivalents to which such claims are entitled.

I claim:

1. A system for factory automation and enhancing machine capabilities, said machine is connected with a machine controller having a Central Processing Unit (CPU) connected to a display and a keyboard/mouse, the system comprises:
    a cable extending between the machine controller and the system to transfer images intended for the display;
    memory storing a plurality of instructions;
    a processor in communication with the memory to execute the plurality of instructions, wherein the plurality of instructions include:
        a video capturing module to capture the images received from the machine controller at the system via the cable,
        a data extraction module communicating with the video capturing module,
        a data conversion module communicating with the data extraction module,
        a data analysis engine communicating with the data conversion software module,
        a protocol conversion module configured to convert analyzed data into user configured protocol,
        a command processor module communicating with protocol conversion module, and
        a Graphical User Interface (GUI) manager module communicating to Data Analysis Engine and also with a Video Output module, which is electrically connected to the display of the machine controller; and
    a keyboard and mouse simulator hardware module communicating with the command processor module and also electrically connected to the CPU of the machine controller, wherein:
    the video capturing module is configured to capture a screen image of contents displayed on the machine controller's display periodically;
    the data extraction module is configured to receive the screen images captured and outputted from the video capturing module and extract the data from the screen image;
    the data conversion software module is configured to convert the extracted data from the image into user configured format;
    the data analysis engine is configured to combine, correlate and analyze data of the machine controller received from the data conversion software module and from external sensors, equipment and devices and is configured to send analyzed data to a factory equipment controlling device through the protocol conversion module;

the command processor module is configured to identify a series of mouse clicks and keyboard entries required to be performed to execute a control signal, command, action or instruction sent by the factory equipment controlling device; and the keyboard and mouse simulator hardware module is configured to simulate the mouse clicks and/or keyboard entries to execute the control signal sent by the command processor module.

2. The system for factory automation and enhancing machine capabilities as claimed in claim 1, wherein the data extraction module is configured to perform an optical character recognition (OCR) to convert the information displayed on the screen image to digital information.

3. The system for factory automation and enhancing machine capabilities as claimed in claim 1, wherein the protocol conversion module includes a Semiconductor Equipment Communication Standard/General Electronic Module (SECS/GEM) software module, a Modbus software module, an Open Platform Communication (OPC) software module, a JavaScript Object Notation (JSON) software module and a Message Queuing Telemetry Transport (MQTT) software module and a custom protocol software module.

4. The system for factory automation and enhancing machine capabilities as claimed in claim 1, wherein the video capturing module is configured to capture the screen image of a Programmable Logic Controller (PLC), a Human Machine Interface (HMI) or other parts of the equipment through an external image capturing device such as a camera, or from the display of the machine controller through a video recording device.

5. The system for factory automation and enhancing machine capabilities as claimed in claim 1, wherein the GUI manager module is configured to detect GUI elements such as push button, drop-down selection, text box, etc. from the captured images through computer vision techniques in user configured language and apply user configuration to automatically design a new enhanced GUI that includes data from other external sensors/devices/equipment along with user specified enhancements and sends to the display of the machine controller through a video output module.

6. The system for factory automation and enhancing machine capabilities as claimed in claim 5, wherein the command processor module is configured to detect the keyboard and mouse events on the enhanced GUI and map or translate to corresponding keyboard entries and mouse clicks of the original GUI of the equipment controller and send same activity to the equipment controller through mouse and keyboard simulator module.

7. A method for factory automation and enhancing machine capabilities comprises the following steps:
a) configuring the system to define the data to be received from a machine controller of the factory equipment and to define the command to be sent from a factory equipment controlling system to the machine controller of the factory equipment;
b) capturing the screenshots of the machine controller's display unit or other parts of the machine through a video capturing module;
c) applying user configuration to extract data from the captured images of the machine controller or machine through an OCR technology or other computer vision techniques and converting the information displayed on the image into digital information through a data extraction module;
d) converting the data extracted from the captured image into the user configured format through a data conversion software module and categorizing the data into Alarm, Event, Image or Data "tags" and sends them to data analysis engine;
e) combining, correlating and analyzing data from received from the data conversion module and external sensors, devices or equipment through a data analysis engine and sending the analyzed or raw data to the factory equipment controlling system in SECS/GEM, Modbus, OPC, JSON, MOTT or custom protocol format;
f) sending command from the factory equipment controlling system in either SECS/GEM, Modbus, OPC, JSON, MOTT or custom protocol format through a SECS/GEM software module, a Modbus software module, a JSON software module, a MQTT software module or a custom protocol software module to interpret the command and accordingly the command is sent to a command processor software module;
g) identifying and converting the command into the series of mouse clicks and keyboard entries through the command processor software module to execute the command sent by a factory host, a Manufacturing Execution System (MES) or an Enterprise Resources Planning (ERP) system;
h) simulating mouse and keyboard through a mouse and keyboard simulator hardware module to execute the command for controlling the factory equipment,
i) Combining graphical user interface (GUI) from the machine controller with external sensors, devices or equipment to prepare uniform coherent graphical user interface (GUI) and displaying on the display device of the machine controller.

\* \* \* \* \*